United States Patent
Zink et al.

[11] Patent Number: 6,161,079
[45] Date of Patent: Dec. 12, 2000

[54] METHOD AND APPARATUS FOR DETERMINING TOLERANCE AND NOMINAL MEASUREMENT VALUES FOR A COORDINATE MEASURING MACHINE

[75] Inventors: Joseph H. Zink, Beavercreek; Mark K. Schindler, Miamisburg, both of Ohio

[73] Assignee: Giddings & Lewis, LLC, Fond du Lac, Wis.

[21] Appl. No.: 08/914,746

[22] Filed: Aug. 18, 1997

[51] Int. Cl.[7] .................................................. G01B 3/22
[52] U.S. Cl. ........................... 702/168; 700/195; 33/503; 33/504; 33/505
[58] Field of Search ............................... 702/89, 95, 189, 702/168; 364/474.35; 33/503, 504, 505, 556; 318/632; 700/86, 187, 195

[56] References Cited

U.S. PATENT DOCUMENTS

| | | | |
|---|---|---|---|
| 4,296,474 | 10/1981 | Hurt | 702/95 |
| 4,819,195 | 4/1989 | Bell et al. | 702/95 |
| 4,945,501 | 7/1990 | Bell et al. | 702/95 |
| 5,471,406 | 11/1995 | Breyer et al. | 702/168 |

*Primary Examiner*—Kamini Shah
*Attorney, Agent, or Firm*—Foley & Lardner

[57] ABSTRACT

A method of operating a coordinate measuring machine (CMM) provides the operator with the ability to automatically set the tolerance value of the part measurement based on preset conditions, and make an educated guess or estimate of the nominal part value during the measurement. This nominal estimation technique is based on the actual measurement value taken by the CMM, and the information supplied about the tolerance limits. This estimation technique of the present invention makes it much easier for the operator to measure the part and produce a report, since it significantly reduces the amount of operator keystroke information required to be manually input via the keyboard.

20 Claims, 9 Drawing Sheets

Microfiche Appendix Included
(6 Microfiche, 541 Pages)

METHOD AND APPARATUS FOR
DETERMINING TOLERANCE AND
NOMINAL MEASUREMENT VALUES FOR A
COORDINATE MEASURING MACHINE

REFERENCE TO COMPUTER PROGRAM APPENDIX

A computer program microfiche appendix, comprising a total of 541 frames of computer object code listing in six Microfiche sheets, is submitted herewith as Appendix A, and is hereby incorporated by reference in this specification as if fully set forth herein.

AUTHORIZATION TO COPY COMPUTER PROGRAM APPENDIX

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of the Invention

The present invention generally relates to the operation of a coordinate measuring machine (CMM) and the like. More particularly, the present invention relates to a technique for determining tolerance measurement values and estimating nominal measurement values for the CMM operator to reduce data entry and operator error.

2. Description of the Prior Art

Coordinate measuring machines (CMM's) have been used for years for industrial quality control to inspect the products of computer numerical control (CNC) machine tools and to check feature locations of parts after machining. Although the CMM was once considered an exotic tool found only in large manufacturing plants, the increased need for accurate measurement of components has become an important concern for small job shops as well. Accordingly, modern CMMs are significantly smaller and more affordable, and are becoming commonplace in the average machine shop.

However, in the past, the calibration and operation of a coordinate measuring machine was a slow and tedious process, typically designed to be used by skilled quality control inspectors. Even today, most CMMs are designed to be operated by a single, skilled user, typically for measuring either a single type of part or a series of the same type of parts. The CMM operator often uses a predetermined or "canned" part program in the "Run Mode" of operation to check tolerances on a production run of identical parts. More sophisticated CMM operators can create the part programs to perform simple measurements and provide basic inspection reports. That is not the case, however, for the machinist in the small job shop who only occasionally needs to use a CMM. In many of the smaller shops, these "walk-up users" are trained CNC machine tool operators, toolmakers, etc., who only need to make a few quick measurements to verify a tool setup. The walk-up user does not have extensive training in the operation of the CMM, and may have little or no familiarity with the setup or calibration procedure of the machine. Hence, the walk-up user requires a simple, fast, user-friendly computer interface that will allow him to quickly make his measurements and get back to machining the part.

One problem associated with the CMM for the small job shop is the time and effort it takes to have the operator input information regarding measurement tolerance values and nominal values. The nominal value represents the measurement value to which the part was optimally designed to meet, while the tolerance value represents the deviation amount, either high or low of the nominal, that will be acceptable. In other words, each machined part has a nominal value and a tolerance value or range which defines the acceptable range for a part.

These nominal values and tolerance values are specified on the mechanical drawing for every feature of the part to be measured. For example, when the operator measures the diameter of a circle and obtains a result of 1.997 inches, he must go to the report screen or setup screen and enter the nominal value and tolerance values from the blueprint. The circle may have a nominal diameter of 2.000 inches with a tolerance of 0.005 inches. If the user does not enter these numbers into the computer, they will not appear on the results page of the report, and thus, the user will not have a useful record of whether the part is acceptable or not. Unless the operator individually inputs each nominal and tolerance value before continuing with the measurement, most CMMs will default to zero such that all measurements will appear to be out of specification.

The main problem lies in the realization that there may be one hundred or more part features to measure for a particular part, and several characteristics to be measured for each part feature. This would result in the operator having to key-in hundreds of measurement values for each report. Not only is this data entry extremely tedious and time-consuming, but each time the operator manually enters data into the CMM system, there is provided one more opportunity for a measurement error to occur, due either to incorrect data entry or the misreading of a blueprint.

A need, therefore, exists for a technique for automating this process such that the CMM operator does not have to spend time entering nominal measurement values and their tolerances for each part feature characteristic to be measured.

OBJECTS AND SUMMARY OF THE INVENTION

Accordingly, it is a general object of the present invention to provide a CMM having a user-friendly software interface that overcomes the aforementioned disadvantages.

It is a more particular object of the present invention to provide an improved method of operating a CMM which is adapted for use by a small machine shop.

It is a further object of the present invention to provide estimated nominal measurement values and tolerance limits for each part feature and characteristic such that the operator of the CMM does not have to key in this information for each part.

The present invention provides the operator with the ability to automatically set the tolerance value of the part measurement based on preset conditions, and make an educated guess or estimate of the nominal part value during the measurement. This nominal estimation technique is based on the actual measurement value taken by the CMM, and the information supplied about the tolerance limits. Hence, the nominal value estimation feature is accomplished in two steps. The first step is to set up the tolerance scheme. The second step is to estimate the nominal values based on the actual measured value and the preset tolerance scheme.

In the first step of the process, the operator fills out a tolerance scheme screen to associate a tolerance value or precision setting for each part feature with one, two, and three significant digits (and a setting for the angular features). This step is similar to the procedure performed by the part designer for the engineering drawing. In the second step of the process, a software estimation routine is used to estimate the nominal value, given the actual measured value and the stored tolerance schemes. The estimation routine is based on the assumptions that the majority of the feature measurements are fairly close to being in-tolerance, and that the nominal value is a "rounded number" (i.e., typical nominal numbers used in machining parts).

Using this tolerance scheme information and the assumptions about the nominal values, the computer then makes an educated guess at the nominal value in view of the measured part value. This estimation of the nominal values makes it much easier for the operator to measure the part and produce a report, since it significantly reduces the amount of operator keystroke information required to be manually input via the keyboard. The estimated nominal value feature can be turned off for those operators who do not need or want to use it.

Hence, according to the present invention, a method of operating a coordinate measuring machine (CMM) is provided which includes the steps of: (a) setting up a plurality of tolerance value schemes containing measurement tolerance values for a plurality of part features; (b) measuring actual values for a plurality of part characteristics for a particular part feature; and (c) estimating a nominal measurement value for each part characteristic measured for the part feature based upon the actual measured value and the preset tolerance value scheme.

BRIEF DESCRIPTION OF THE DRAWINGS

The features of the present invention which are believed to be novel are set forth with particularity in the appended claims. The invention itself, however, together with further objects and advantages thereof, may best be understood by reference to the following description when taken in conjunction with the accompanying drawings in which:

DETAILED DESCRIPTION OF THE PREFERRED EMBODIMENT

Figure 1:
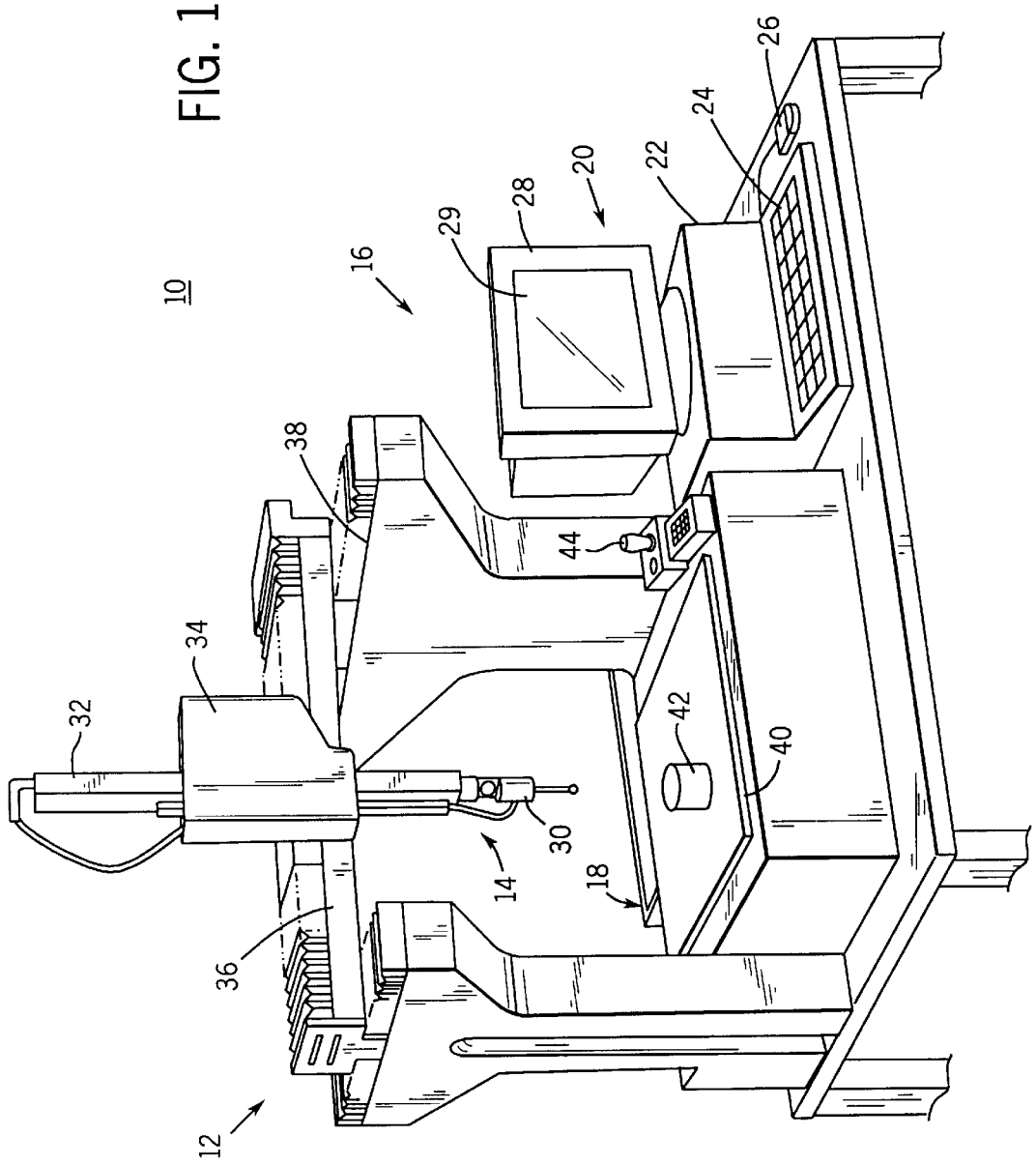
FIG. 1 is a perspective view of a typical CMM system according to the present invention.

Referring now to FIG. 1, there is illustrated a coordinate measuring machine (CMM) generally indicated by the reference numeral 10. The CMM 10 generally includes an X-Y-Z positioning device, generally indicated as 12; a probe system 14, and a control system, generally indicated as 16. The control system 16 includes a machine controller 18, computer hardware 20, and computer software for programming the hardware. In the preferred embodiment, the computer hardware 20 includes an IBM-compatible personal computer (PC) 22 having a keyboard 24, a mouse 26, and a video display monitor 28 having a display screen 29. Preferably, the PC should be capable of effectively running the WINDOWS NT or WINDOWS 95 (trademarks of Microsoft, Inc.) operating system.

The probe system 14 includes a probe 30 which is inserted into a Z-axis probe arm or shaft 32 of the positioning device 12. The probe shaft 32 is supported and guided for movement in the Z-axis direction by a Z-axis carriage 34 using preloaded air bearings and the like. The a Z-axis carriage 34 is supported on a top rail X-axis carriage 36 by preloaded air bearings or the like. The X-axis carriage 36, in turn, is also supported and guided by preloaded air bearings or the like on a Y-axis carriage 38 for movement in the Y-direction. The device 12 also includes a platform or worktable 40 which typically contains tapped holes to facilitate the clamping and locating of parts.

In a typical operation, the part to be measured 42 is placed on the worktable 40 of the CMM at a random location. Generally, this location is approximately central to the machine X-Y-Z axes in order to access all of the part surfaces to be inspected with the probe. The measuring envelope or volume is defined by the X-Y-Z travel of the machine. Depending upon the size of the part and the type of probe used, the part may need to be clamped to the machine table. If multiple inspections of similar parts are required, a reference location point may be established with a reference precision cube or sphere. The probe is then moved, manually or under machine control using the joystick 44, until contact is made with the desired part feature. Reader heads, travelling on each axis along built-in axis measuring scales, transfer the instantaneous machine position to the computer interface where the software performs three-dimensional geometric analysis. The dimensions and geometries may then be calculated, compared, evaluated, stored, or printed out as required.

For further details regarding the overall construction and operation of a CMM and the computer interface therefor, refer to U.S. Pat. No. 4,819,195, which is hereby incorporated by reference as if fully set forth herein. An example of a coordinate measuring machine which can be used with the present invention is the CORDAX (trademark of Giddings & Lewis, Inc.) model number RS-5 available from the Sheffield Measurement division of Giddings & Lewis, Inc. located in Dayton, Ohio.

The key to the productivity of all forms of computer assisted CMMs lies in the sophistication and ease of use of the associated computer software. The user-interface software may be the most important element in any CMM system, because its capability determines how many part features can be measured, while its simplicity determines the extent and how much the machine is used. Since modern CMM systems use personal computers to control the CMM, the operator interface software resides on the PC. For example, the MEASUREMAX (trademark of Giddings & Lewis, Inc.) software is available to run on WINDOWS 95 operating systems which are widely used in PCs. Please refer to the MEASUREMAX software and documentation for further details regarding the overall operation of the software interface.

Most CMM software packages, including MEASUREMAX, can be described as a toolbox of measurement capabilities that are available to all types of users. The software interface entitled MAXLITE (trademark of Giddings & Lewis, Inc.), which incorporates the features of the present invention, does not fit that description. Instead, it can be described as a software package that targets specific types of users. For each of three targeted users, MAXLITE provides a distinct mode of operation.

The first mode, called the "Run Mode", is designed for those users who want to run a prewritten or "canned" part program. In this mode, only the functions that are specific to running a canned part program are available. No measurement tools or programming capabilities are found in this mode. Instead, the mode presents a very simple user interface specifically designed for the novice CMM operator to measure specific parts with canned part programs.

The second mode, called the "Measure Mode", is designed specifically for walk-up users to perform quick measurements. As explained above, the walk-up user is typically a CNC machine tool operator who does not have extensive training on the CMM, and has little or no use for a Programming Mode to design a part program or a Run Mode to use a canned part program. Hence, in the Measure Mode, no such software Run Modes or Programming Modes are offered. The Measure Mode provides the capability necessary to measure the most common part features for a specific class of operator. These features are typically points, lines, circles, planes, and distances or widths. By limiting the capabilities presented to the operator, the software user interface has been greatly simplified.

The third mode, called the "Program Mode", is designed for those CMM operators who need to create part programs that perform simple measurements and provide basic reporting capability. The Program Mode is also limited, in that it is not intended to address every part programming need or to provide the ultimate CMM functionality. Instead, it is intended to be used to create only basic part programs, which allows the user interface to be made much simpler. This limited Program Mode is ideal for the beginning CMM operator just learning to create part programs.

Figure 2A:
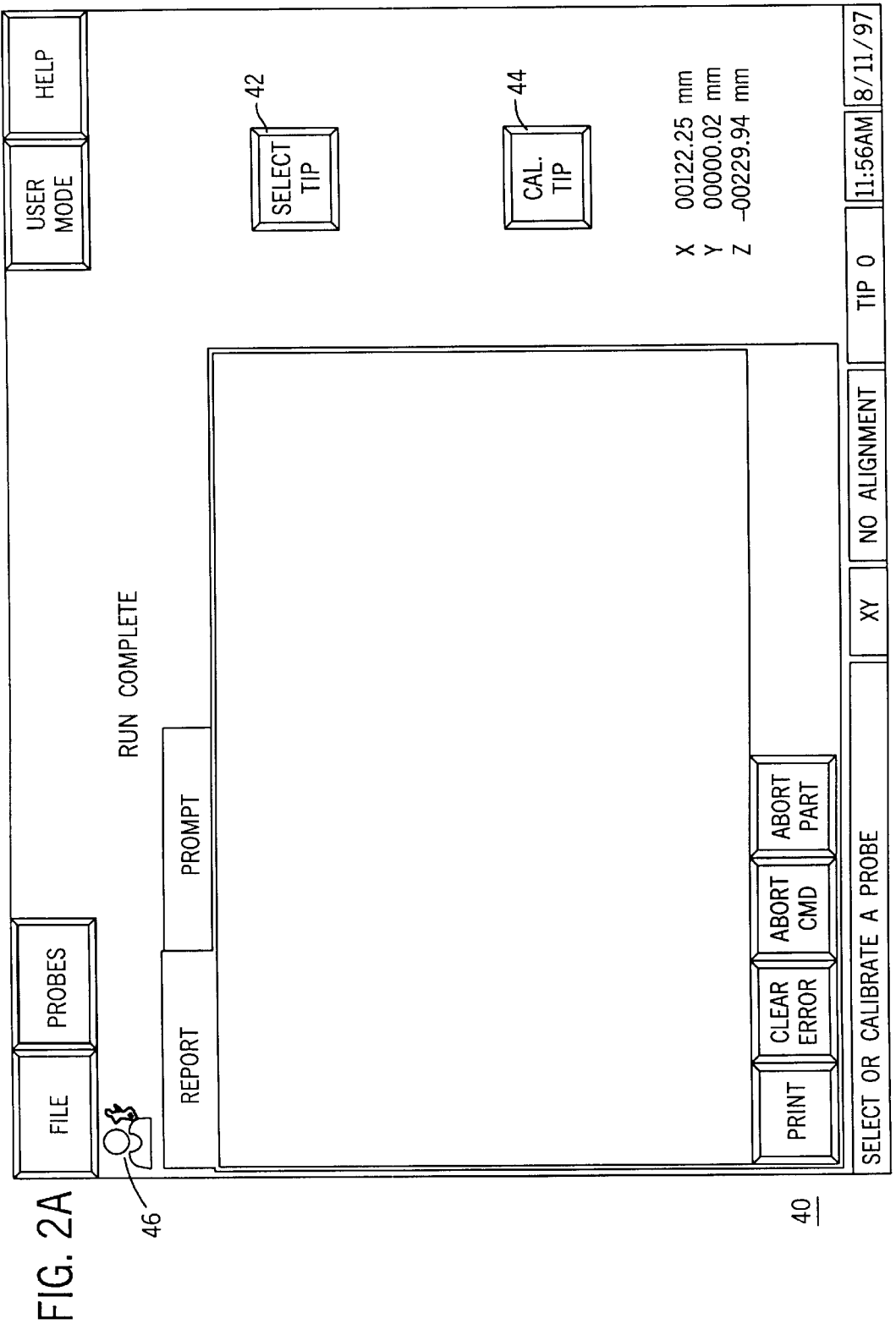
FIGS. 2A–2F are pictorial representations of screen displays presented on the personal computer display monitor for operator interface in accordance with the present invention.

FIGS. 2A–2F are pictorial representations of some of the software interface screen displays presented on the PC display screen 29 in accordance with the preferred embodiment. FIG. 2A shows a representative screen display 40 for the Run Mode of operation. In addition to the ability provided to the operator to change user modes, the Run Mode screen presents a simple user interface to select a probe tip using button 42 and calibrate the probe tip via button 44, and locate and run a specific part program. Note that the Run Mode status icon 46 is displayed at all times when the user is in this mode.

Figure 2B:
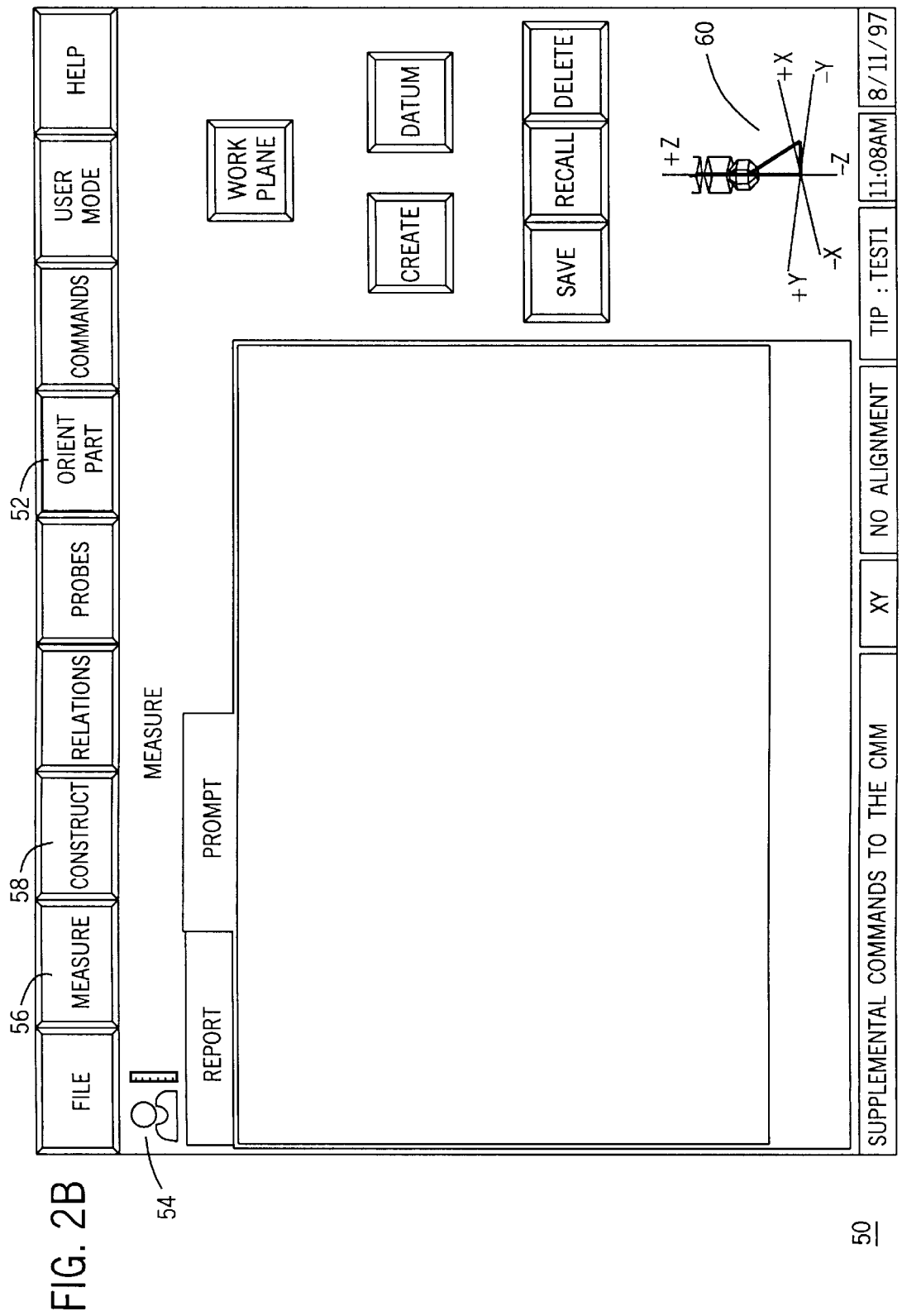

FIG. 2B is a representation of one of the screen displays 50 provided to the user in the Measure Mode of operation. This screen provides the user with the capability of verifying the probe calibration, and of measuring common part features. Note that standard metrology terminology has been replaced by standard manufacturing terminology. For example, instead of presenting the walk-up user with an option to "Establish a Reference Frame" (which is typical for CMM software interfaces), the displayed screen uses the manufacturing technology "Orient the Part" on the button 52. Note that the Measure Mode status icon 54 appears whenever the user is in this mode. The Measure Feature icon 56 and the Construct Feature icon 58 have also been human-engineered to be more meaningful to the average CNC machine tool operator instead of the average CMM operator. Moreover, the entire user interface can also be operated via a touch screen instead of a mouse.

Note that screen display 50 also includes a three-dimensional graphic representation 60 showing the active probe tip recognized by the CMM software. The controller software determines whether a motorized probe head is present and the exact location the probe tip. By using three-dimensional vector graphic routines, the controller software presents the graphic representation 60 of the probe relative to the machine's coordinate system. This technique minimizes the occurrence of measurement errors which could be introduced by the unwary operator who inadvertently used CMM data taken with an unrecognized probe tip.

Figure 2C:
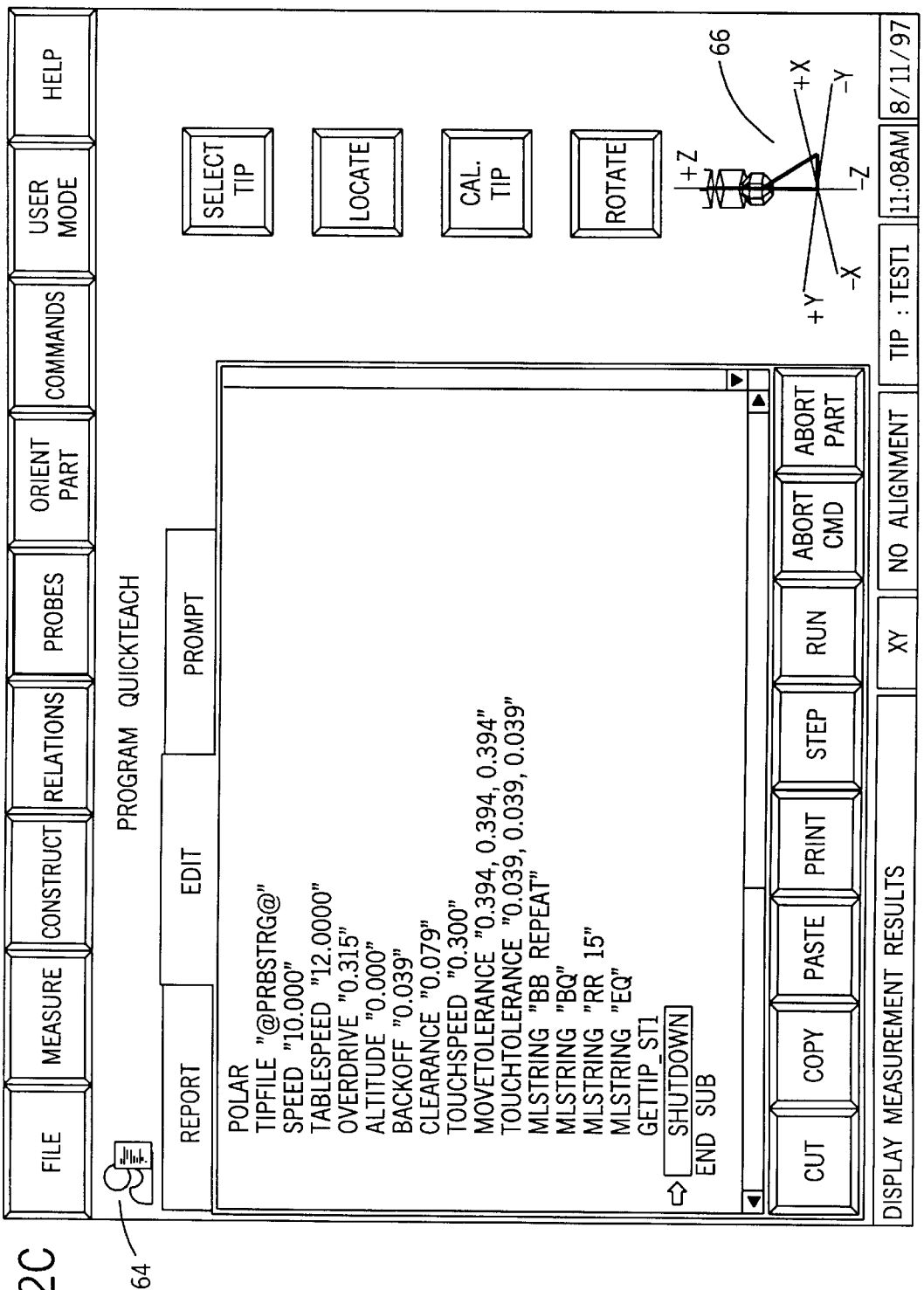

FIG. 2C provides a representative screen display 62 for the user in the Program Mode. In this mode, the beginning CMM programmer is assisted by the straightforward layout and appropriate use of icons to learn how to create a simple part program. In the Program Mode, the Program Mode status icon 64 appears. The image 66 of the active probe tip is also displayed in this mode.

Figure 2D:
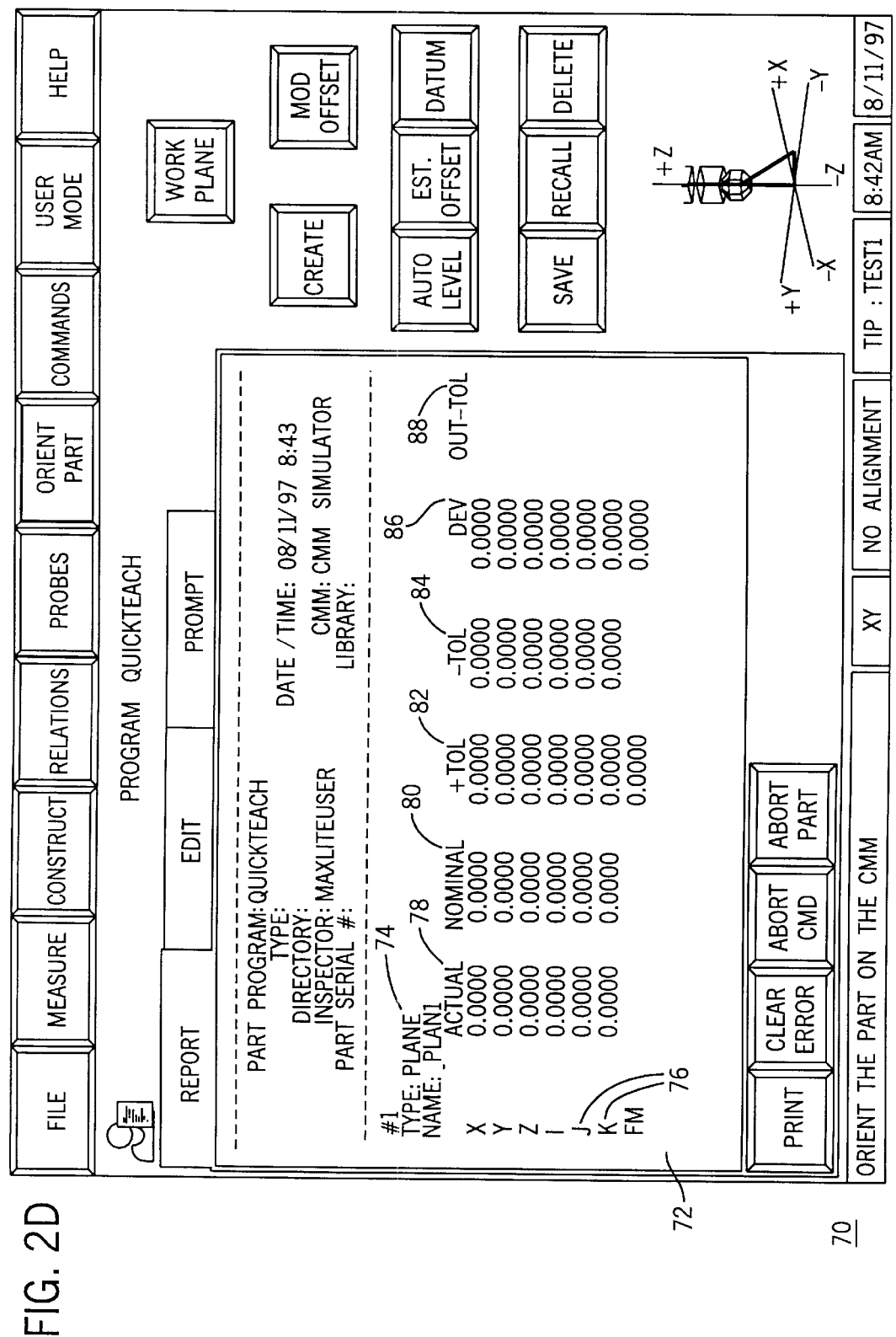

FIG. 2D is another screen display 70 in the Program Mode. This display, however, illustrates the format of the measurement report 72. In this example, the type of feature being measured is the PLANE shown at 74, using part characteristic measurements X, Y, Z, I, J, K at 76. Note that each characteristic measurement has a series of columns to report the data: the ACTUAL measured value in 78, a NOMINAL value in 80, a plus tolerance value +TOL in 82, a minus tolerance value –TOL in 84, a calculated deviation DEV in 86, and an out-of-tolerance indication OUT–TOL in 88. These values are all zero in this display, since the measurement has not taken place.

Figure 2E:
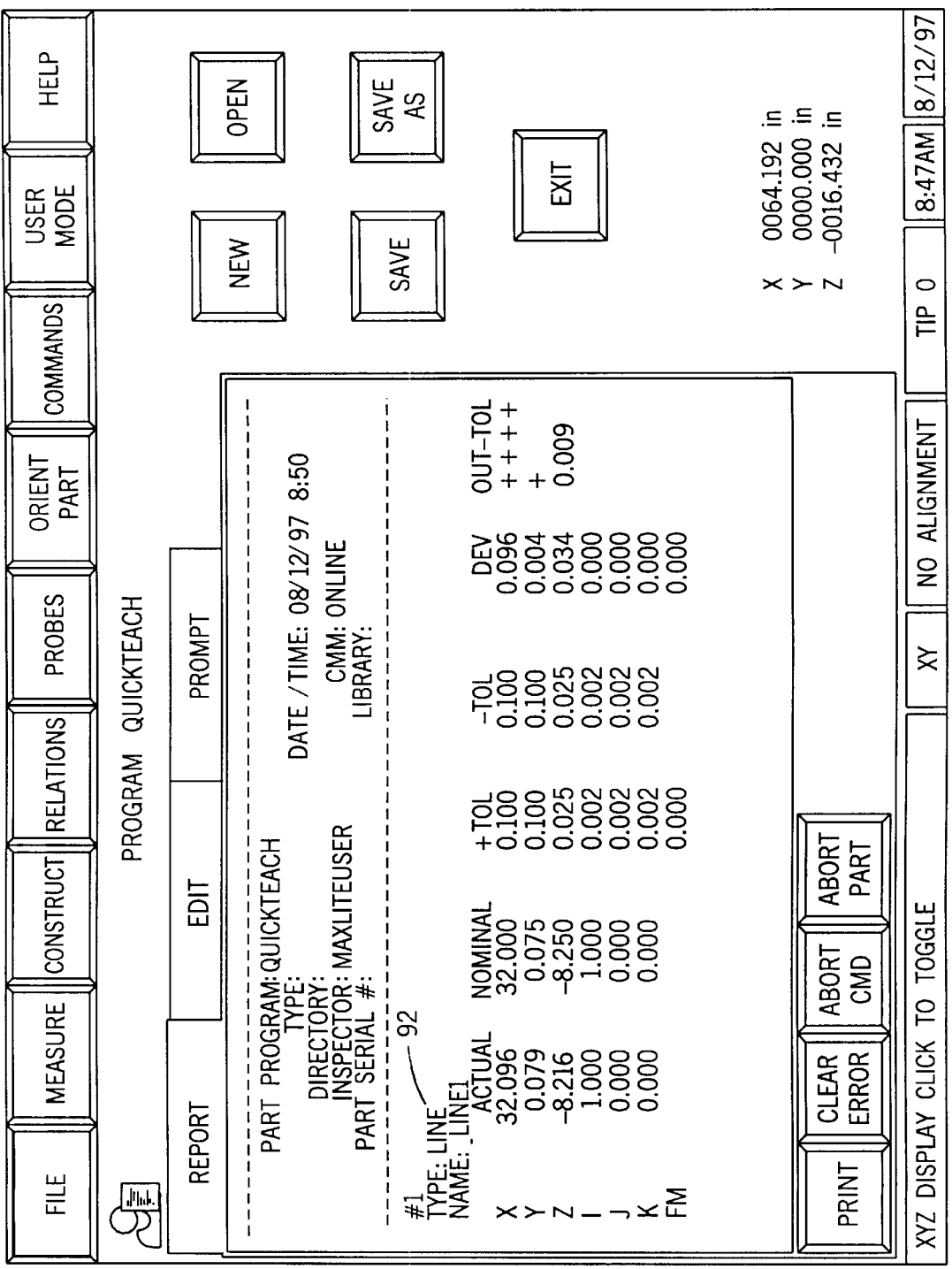

FIG. 2E illustrates a screen display 90 in the Program Mode for a LINE feature measurement 92 which has already been taken. Note that the same columns appear, which would normally require entry and/or calculation of the values listed therein. In most CMM software programs, the nominal value and tolerance values would have to be individually keyed in by the CMM operator from the blueprint or specification sheets. However, as will be explained below in more detail, the present invention allows the operator to group these tolerance values into a number of tolerance schemes, and use the tolerance schemes to estimate the nominal values. In this manner, the operator only has to verify the estimated nominal values and key-in only those that do not match the blueprint.

Figure 2F:
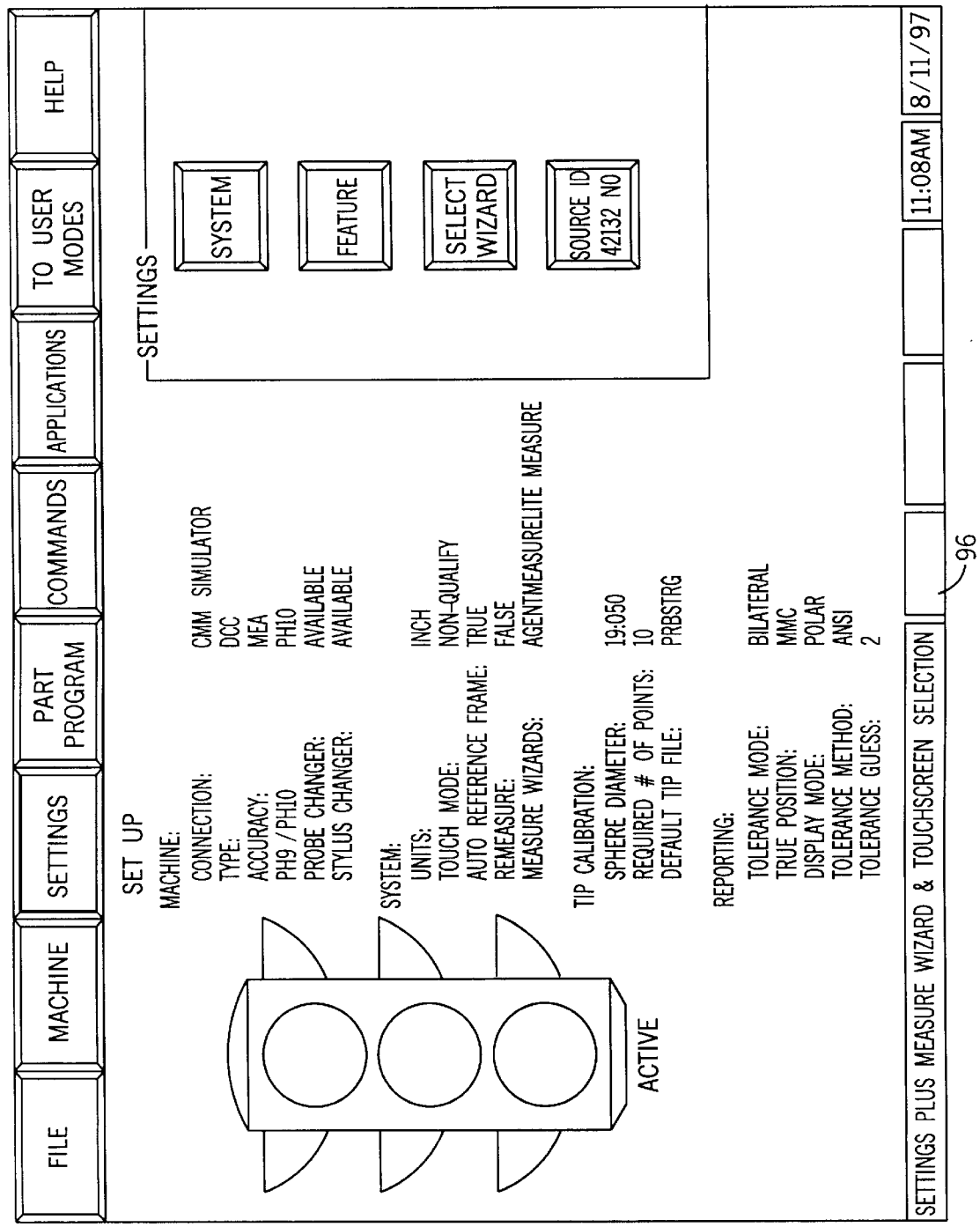

FIG. 2F is a representative screen display 94 in the Setup Mode. Note that the last screen entry 96, labeled Tolerance "Guess", indicates that the nominal value estimation feature of the present invention has been activated.

It can be appreciated by those skilled in the art that the tolerance values set forth in a blueprint are determined by a manufacturing engineer or designer as typically being based on the machining processes required for the part. Therefore, for a small job shop, there may only be a few of these part tolerance schemes. The present invention allows the operator to set up the software interface to describe several sets of these tolerance schemes. Moreover, several default tolerance schemes are included with the software package. Included in each tolerance scheme is the number of significant digits for each type of feature. The user only needs to know what tolerance scheme number or name is required. The software then uses the feature type to determine the number of significant digits in the tolerance and then obtain the tolerance value itself.

For example, a typical blueprint for a part to be machined may include the following in the legend:

| | |
|---|---|
| X.X | +/−0.060 inches |
| X.XX | +/−0.020 inches |
| X.XXX | +/−0.005 inches |
| angle | +/−0.5 degrees |

The present invention allows the operator of the CMM to create a tolerance scheme for this part using the above information.

Figure 3:
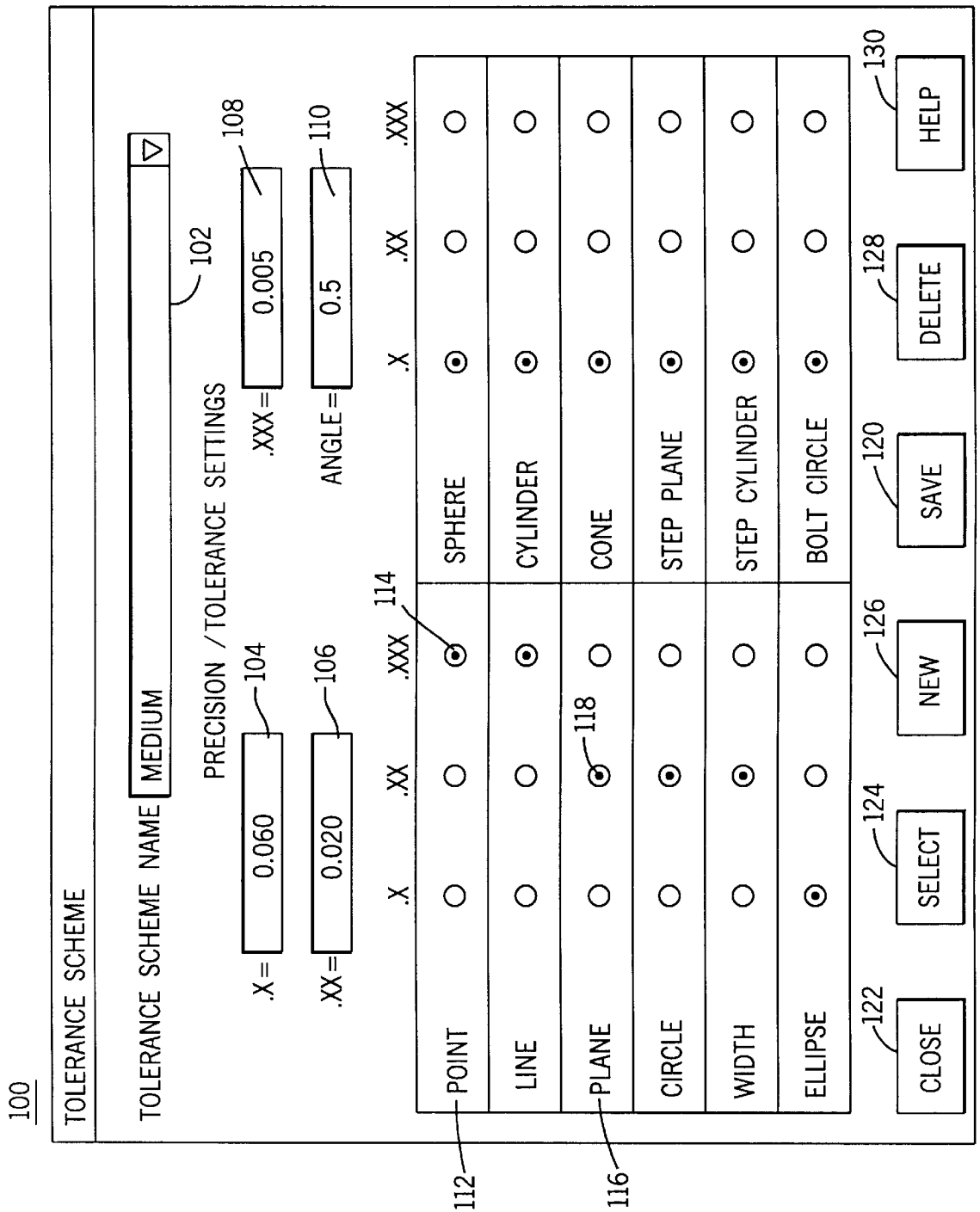
FIG. 3 is a pictorial representation of screen display used for operator interface during the tolerance scheme setup step in accordance with the present invention.

FIG. 3 is a pictorial representation of the "Tolerance Scheme" screen 100 in the Setup Mode of the software interface. This screen performs two basic functions: first, it assists the operator in creating several tolerance schemes, wherein each scheme associates a certain tolerance setting to a particular feature type; and second, it allows the user to select a specific tolerance scheme. There is no limit to the number of schemes which can be created or selected. Each tolerance scheme is stored as a separate entry in the WINDOWS registry.

The "creation" function of a tolerance scheme includes three steps. First, the tolerance scheme name is entered by the operator in the Name field 102. In the example shown in FIG. 3, a default tolerance scheme entitled "Medium" is displayed. This name may be descriptive of a certain level of precision, as indicated. The name may also correspond to a certain part to be measured, such as "Blade 5406-987", or to a certain manufacturing process, such as "Jig Bore". As another example, there may be a typical tolerance scheme for a part machined on a certain type of CNC machine, such as the Fadal CNC Model 32MP Vertical Machining Center (VMC). In that case, the user would create a tolerance scheme labelled "Fadal VMC". In each of these cases, the operator will simply select that machining process by name and that scheme becomes active.

The second step is to associate a tolerance value or setting with one, two, and three significant digits, plus a tolerance value for the angular features. This step is similar to what the part designer does on the drawing. To do this, the user simply enters the tolerance values for the following fields:

| | | |
|---|---|---|
| | Field 104 | X.X |
| | Field 106 | X.XX |
| | Field 108 | X.XXX |
| | Field 110 | Angle |
| such as: | | |
| | X.X = 0.060 inches | |
| | X.XX = 0.020 inches | |
| | X.XXX = 0.005 inches | |
| | Angle = 0.5 degrees | | such as:
  X.X=0.060 inches
  X.XX=0.020 inches
  X.XXX=0.005 inches
  Angle=0.5 degrees This second step is relatively straightforward if the blueprint legend already provides these tolerance schemes. Otherwise, individual measurements will have to be grouped into a tolerance scheme by the CMM operator.

The third step in setting up the tolerance scheme is to associate each feature type with a number of significant digits, i.e., either X.X, X.XX, or X.XXX. This is done in screen 100 by selecting the appropriate option button next to the feature type. For example, the feature 112 labelled "Point" has been set via option button 114 to the "X.XXX" tolerance setting of 0.005 inches, while the "Plane" feature 116 has been set via button 118 to the "X.XX" setting of 0.020 inches.

Once the tolerance scheme screen 100 is completely filled in, the operator would click the mouse cursor on the "Save" button 120 to save the tolerance scheme in the registry. Alteratively, the "Close" button 122 closes the tolerance scheme screen 100 without saving any information. The "Select" button 124 is used to select which tolerance scheme name, found in field 102, is desired by the user. The "New" button 126 is clicked when the user desires to create a new tolerance scheme, and then is required to enter a new tolerance scheme name in field 102. The "Save" button 120 is also used when any modifications to an existing tolerance scheme have been made. The "Delete" button 128 will delete an existing tolerance scheme. Of course, the "Help" button 130 provides help screen information to the operator.

The "selection" function of a tolerance scheme is accomplished when the operator selects a tolerance scheme by simply scrolling through the tolerance scheme names from the selection list in field 102. Any time that the operator wants to select a different scheme (for example, because the part he is measuring comes from a different manufacturing process), he simply goes into the Setup Mode and picks a new tolerance scheme name. One of the default tolerance schemes is named "Off", which represents the method used to disable the nominal value estimation feature to be described below. Once this feature is turned off, the nominal and tolerance values must be manually keyed-in by the operator.

During the Measure Mode, the tolerance value is determined by simply extracting the information from the registry for the selected tolerance scheme. First, the feature type is located, and an index value of 1, 2, or 3 is associated with the feature type. This index is used to acquire the actual tolerance value for each feature from the stored tolerance scheme. This tolerance value is used for each reported dimension for that feature, e.g., X dimension, Y dimension, diameter measurement, etc. For bilateral tolerancing, this tolerance value is inserted directly into the report screen data for the +TOL and −TOL columns. For limit tolerancing, this value is preserved until an estimated nominal value has been determined. The tolerance value is then added to and subtracted from the estimated nominal value to provide the DEV report screen data.

For example, if a circle is measured, the associated tolerance scheme may indicate that the circle feature has two significant digits to the right of the decimal point, i.e., "X.XX". The index value for this feature would be 2, such that the tolerance for X.XX is 0.020 inches. Therefore, for each part characteristic (such as the X-Y-Z location of the center, the diameter, and the circle form) that is reported for the circle part feature, the tolerance value of 0.020 inches is used.

The estimate for the nominal value is based on the following two assumptions: (1) that most features are close to being in-tolerance; and (2) that the nominal measurement value is some "rounded number". As used herein, a "rounded number" refers to a number or fraction that would commonly be found on an engineering drawing for a nominal value of a part, typically ending with a X.0, X.1, X.5, X.25, X.125, etc., or having a least significant digit of 0, 1, or 5. Examples of "rounded numbers" would be 10, 1, 0.5, 0.25, 0.1, 0.025, 0.01, 0.005, 0.0025, and 0.001. Examples of numbers that would not be considered "rounded numbers" would be 9.88, 1.001, 0.32, and 0.0024.

Figure 4:
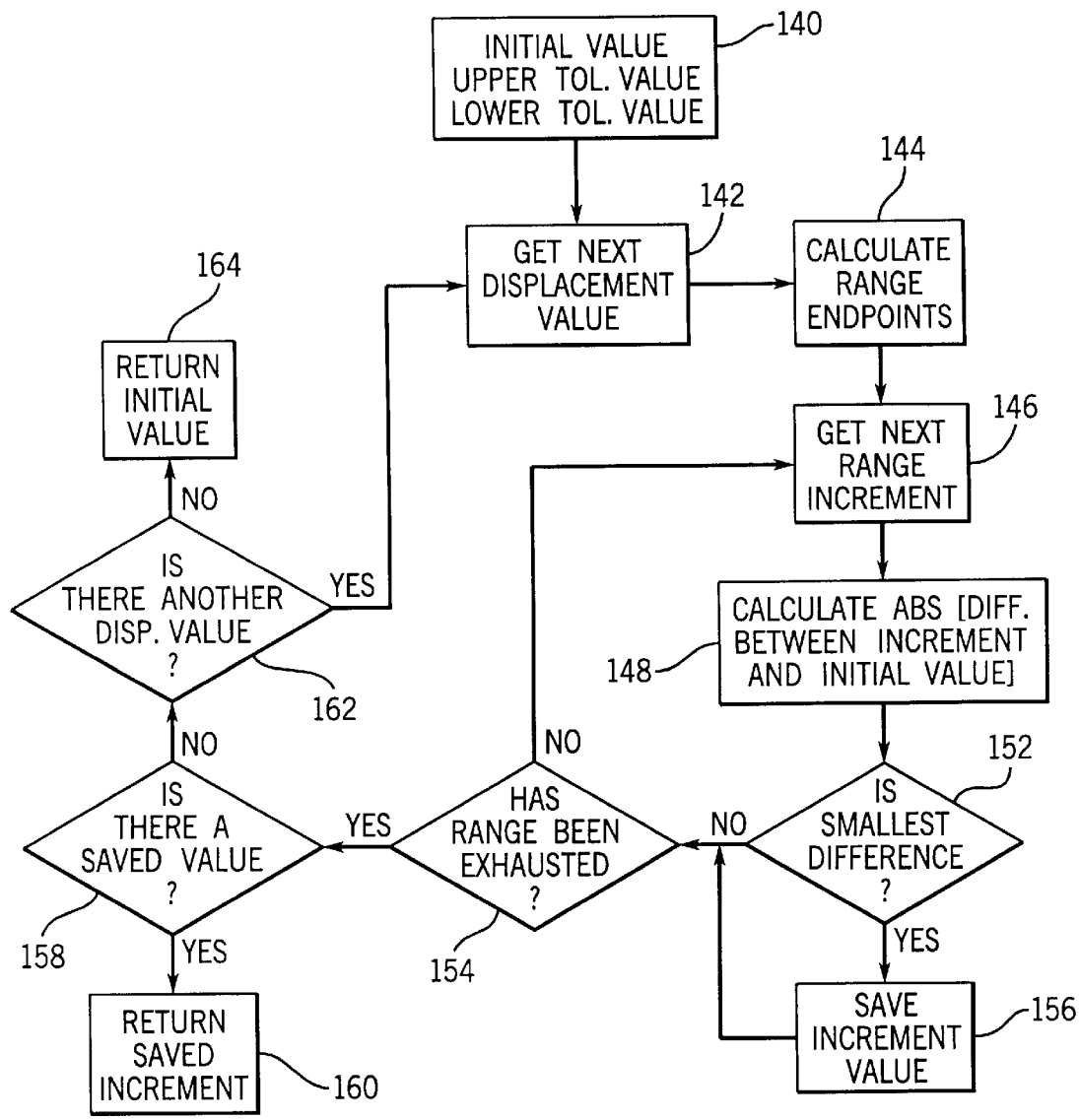
FIG. 4 is a software program flowchart illustrating the general sequence of operations performed by the CPU of the personal computer in estimating the nominal measurement values in accordance with the practice of the preferred embodiment of the present invention.

Based on these two assumptions, the estimated nominal value is determined by calling the "best guess" routine in the software. FIG. 4 is a software program flowchart illustrating the general sequence of operations performed by the PC for this nominal value estimating routine.

In Step 140 of FIG. 4, the estimation program accepts the following three values: an initial value IV, an upper limit tolerance value ULT, and a lower limit tolerance value LLT. In the preferred embodiment, the initial value IV is the actual measured value for that part feature characteristic, and the upper and lower tolerance limits define a range which is twice the tolerance value.

In Step 142, the routine obtains the first element of an array of displacement values DV stored in memory to begin to estimate the nominal value. The displacement values stored in this array could be numbers in any range as long as they are in descending order. In the preferred embodiment, however, the values in the displacement array are as follows: 10, 5, 1, 0.5, 0.25, 0.125, 0.1, 0.05, 0.025, 0.0125, 0.01, 0.005, 0.0025, 0.00125 and 0.001. The best guess routine uses these displacement values in the order that they are stored in the array until it gets a "match". A "match" exists when a multiple of the displacement value exists within the range of the initial value. If no match exists, the estimate that is returned from the best guess routine is the initial value itself. Note that with the implementation of the preferred embodiment, the range does not have to be symmetrical about the initial value.

The next Step 144 is to calculate upper and lower endpoints, UE and LE respectively, for the search for the estimated nominal value. If the displacement value DV is fractional, this is done by simply truncating the initial value IV for the lower endpoint LE, and by truncating and adding 1 to the initial value IV for the upper endpoint UE. If the displacement value DV is an integer, this endpoint determination step is done using the following equations:

$$LE = [INT(LLT/DV)]*DV$$

$$UE = [INT(ULT/DV)+1]*DV$$

where LE=Lower Endpoint, UE=Upper Endpoint, LLT=Lower Limit Tolerance, ULT=Upper Limit Tolerance, DV=Displacement value, and INT(x) is the integer function, which simply truncates the fractional part of (x).

Now that the search endpoints LE and UE have been determined, the Step 146 begins the loop of Steps 146, 148, 152, 154, and 156 to test every increment of the displacement value DV, from the lower endpoint LE to the upper endpoint UE, each time checking if that displacement value is within the tolerance range of the initial value.

First, Step 146 gets the next range increment value to test, i.e., the incremental test value calculated by starting with the LE and adding the DV each time through the loop until the UE is reached. Step 148 performs the test calculation to find the absolute value of the difference between the last incremented test value and the IV. Step 152 compares this difference calculation to the last one stored in memory by Step 156. If the latest difference calculation is the smallest, Step 156 replaces the one stored in memory.

If not, control proceeds to Step 154 to check to see if the test increment range has been exhausted, i.e., whether the UE has been exceeded by the test increment value. If not, this loop continues until it has been exhausted. Once it has, Step 158 checks to see if a test increment value was saved by step 156. If so, the increment value will be the largest one which met the tolerance criteria, and is output as the estimated nominal value at Step 160. Otherwise, Step 162 checks to see if the DV array has been exhausted, and if not, the process starts over at Step 142. If no more displacement values exist, the estimation routine has not found a match, and the initial value IV is returned at Step 164.

Using the above example of measuring a circle using the blueprint tolerance value of +/−0.030 inches, say the actual measured X-value is 12.2487 inches. Then IV=12.2487, ULT=12.2787, LLT=12.2187. For the first DV=10, the formula gives LE=10 and UE=20. The first incremental test value is also 10, so the stored difference is 12.2487−10= 2.2487. The next test value is 20, which does not provide a smaller difference, so it is not stored. The range is now exhausted, so DV=5 is used. The loop processes through the DV array until DV=0.25 is reached, which when added to the truncated IV of 12 gives 12.25. Hence, the estimation routine would return an estimated nominal value of 12.25 inches. The best guess routine is called once for each characteristic of each measured feature. Therefore, in the circle example above, it would be called five times, once each for the X-Y-Z positions for the center of the circle, once for the diameter of the circle, and once for the form of the circle.

The computer program microfiche appendix submitted herewith contains two executable object code programs. The first program, entitled "TEACHER.EXE", includes the vector graphics routines utilized in the preferred embodiment to generate the probe image according to the present invention. The second program, entitled "SETUP.EXE", includes the executable files required to set up the CMM and start the first program. These two program files are a beta test version of the portions of the MAXLITE (trademark of Giddings & Lewis, Inc.) CMM software which contain the present invention. The MAXLITE software normally includes portions of the core code of the previously available MEASUREMAX software. All the software was programmed using Visual Basic 4.0 and is written to the Win 32 interface standard.

In review, it can now be seen that the present invention provides the operator with the ability to automatically set the tolerance value of the part measurement based on preset conditions, and make an educated guess or estimate of the nominal part value during the measurement. This nominal estimation technique is based on the actual measurement value taken by the CMM, and the information supplied about the tolerance limits. This estimation technique of the present invention makes it much easier for the operator to measure the part and produce a report, since it significantly reduces the amount of operator keystroke information required to be manually input via the keyboard.

While specific embodiments of the present invention have been shown and described herein, further modifications and improvements may be made by those skilled in the art. In particular, it should be noted that the CMM system described herein was chosen in the preferred embodiment only as a representative machine which was readily available for the particular application. Furthermore, the actual software programs described in the flowchart and set forth in the appendix hereto are only preferred embodiments of software codes which can be used to accomplish the invention. Numerous other hardware and software modifications may also be made to customize the present invention for various other applications. All such modifications which retain the basic underlying principles disclosed and claimed herein are within the scope and spirit of the invention.

What is claimed is:

1. A method of operating a coordinate measuring machine (CMM) comprising the steps of:

(a) setting up a plurality of tolerance value schemes containing measurement tolerance values for a plurality of part features;

(b) measuring actual values for a plurality of part characteristics for a particular part feature; and (c) estimating a nominal value for each part characteristic measured for the part feature based upon the measured actual value and the preset tolerance value scheme.

2. The method of claim 1, further comprising the step of providing an out-of-tolerance indication if the measured actual value is not within a tolerance range.

3. The method of claim 1, further comprising the step of storing the estimated nominal value in memory such that it can be used for a measurement report.

4. The method claim 3, further comprising the step of providing the estimated nominal value and the measurement tolerance value to a screen for display to the user.

5. The method of claim 1, further comprising the step of storing a tolerance value list in an array in descending order.

6. The method of claim 1, wherein a software program allows the operator to change the tolerance value scheme.

7. The method of claim 1, wherein the part features include a circle, a point, a line, and a plane.

8. The method of claim 1, wherein the precision of each part feature is grouped into at least three categories of X.X, X.XX, and X.XXX, and wherein each of the three categories is assigned the same tolerance value for a plurality of features.

9. A coordinate measuring machine (CMM) comprising:
means for setting up a plurality of tolerance value schemes containing measurement tolerance values for a plurality of part features;
means for measuring actual values for a particular part feature; and
means for estimating a nominal value for the part feature based upon the measured actual value and the measurement tolerance value for the part feature.

10. The CMM of claim 9, further comprising means for displaying a three-dimensional graphic representation of the active probe tip.

11. A method of assisting the user of a coordinate measuring machine (CMM) in entering information in the form of keyboard keystroke data, comprising the step of:
(a) presenting a screen display adapted for setting up a plurality of tolerance value schemes containing measurement tolerance values for a plurality of part features;

(b) presenting a screen display adapted for measuring actual values for a particular part feature; and (c) presenting a screen display adapted for displaying estimations of a nominal value for the part feature based upon the measured actual value and a preset tolerance value scheme.

12. The CMM of claim 9, further comprising means for providing an out-of-tolerance indication if the measured actual value is not within a tolerance range.

13. The CMM of claim 12, further comprising means for storing the estimated nominal value in memory such that it can be used for a measurement report.

14. The CMM of claim 13, further comprising means for displaying the estimated nominal value and the measurement tolerance value to the user.

15. The CMM of claim 14, wherein the means for setting up a plurality of tolerance value schemes allows the operator to select from one of a plurality of stored tolerance value schemes.

16. The CMM of claim 9, wherein the precision of each part feature is grouped into at least three categories of X.X, X.XX, and X.XXX, and wherein each of the three categories is assigned the same tolerance value for a plurality of features.

17. The method of claim 11, further comprising the step of providing the estimations of the nominal value and the measurement tolerance value on a display screen for the user.

18. The method of claim 17, further comprising the step of providing an out-of-tolerance indication if the measured actual value is not within the measurement tolerance value.

19. The method of claim 18, further comprising the step of providing a report including the estimations of the nominal value and the measurement tolerance value and the out-of-tolerance indication.

20. The method of claim 11, wherein each tolerance value scheme includes a plurality of tolerance categories having different tolerance values, and wherein each tolerance category is assigned the same tolerance value for a plurality of part features.

* * * * *